United States Patent
Storer

(10) Patent No.: US 6,709,495 B1
(45) Date of Patent: Mar. 23, 2004

(54) FILTER ASSEMBLY

(75) Inventor: Mark Peter Storer, Bathford (GB)

(73) Assignee: Dyson Limited, Wiltshire (GB)

( * ) Notice: Subject to any disclaimer, the term of this patent is extended or adjusted under 35 U.S.C. 154(b) by 0 days.

(21) Appl. No.: 10/168,950

(22) PCT Filed: Aug. 21, 2000

(86) PCT No.: PCT/GB00/03212

§ 371 (c)(1),
(2), (4) Date: Jun. 24, 2002

(87) PCT Pub. No.: WO01/45545

PCT Pub. Date: Jun. 28, 2001

(30) Foreign Application Priority Data

Dec. 22, 1999 (GB) ................................................ 9930333

(51) Int. Cl.[7] ................................................ B03C 3/011
(52) U.S. Cl. ........................ 96/58; 15/347; 55/485; 55/486; 55/504; 55/DIG. 3
(58) Field of Search ................ 96/55–58, 61, 96/63; 15/347, 353; 95/63, 69, 70; 55/485, 486, 504, 524, 528, DIG. 3

(56) References Cited

U.S. PATENT DOCUMENTS

| 3,763,633 A | * | 10/1973 | Soltis | 55/486 X |
| 4,370,155 A | | 1/1983 | Armbruster | 55/482 X |
| 4,726,825 A | | 2/1988 | Natale | 55/467 X |
| 4,902,306 A | * | 2/1990 | Burnett et al. | 96/58 X |
| 5,108,470 A | * | 4/1992 | Pick | 96/58 |
| 5,230,722 A | | 7/1993 | Yonkers | 55/473 X |
| 5,248,323 A | * | 9/1993 | Stevenson | 55/528 X |
| 5,330,559 A | | 7/1994 | Cheney et al. | 95/63 |
| 5,419,953 A | * | 5/1995 | Chapman | 96/55 X |
| 5,647,890 A | * | 7/1997 | Yamamoto | 95/69 |
| 5,651,811 A | | 7/1997 | Frey et al. | 96/69 |
| 5,656,063 A | * | 8/1997 | Hsu | 96/58 X |
| 5,840,103 A | * | 11/1998 | Dyson | 96/61 |
| 5,989,320 A | * | 11/1999 | Rutkowski | 96/55 |
| 6,036,738 A | * | 3/2000 | Shanbrom | 55/524 |
| 6,171,375 B1 | * | 1/2001 | Howie | 55/DIG. 3 |
| 6,197,096 B1 | * | 3/2001 | Cartellone | 15/353 X |

FOREIGN PATENT DOCUMENTS

| FR | 2 690 509 | 10/1993 |
| GB | 1501927 | 2/1978 |
| GB | 2 267 840 A | 12/1993 |
| WO | WO 99/12635 | 3/1999 |

* cited by examiner

Primary Examiner—Richard L. Chiesa
(74) Attorney, Agent, or Firm—Morrison & Foerster LLP

(57) ABSTRACT

The invention provides a filter assembly for use in a vacuum cleaner having a first filter portion that includes a foam filter, and a second filter portion located downstream of the first filter portion and containing a HEPA grade filter medium, the first and second filter portions being held directly adjacent one another. The first filter portion also includes an electrostatic filter located on a side of the foam filter facing the second filter portion. The foam filter of the first filter portion is, in use, exposed directly to a dust-laden airflow. The provision of the electrostatic filter on the foam filter eliminates the possibility of dust initially retained by but later released from the foam filter escaping from the first filter portion.

16 Claims, 4 Drawing Sheets

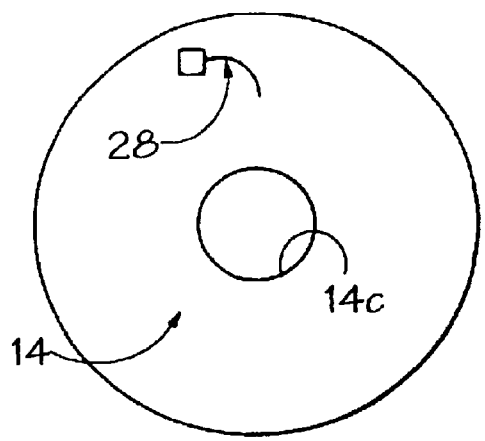
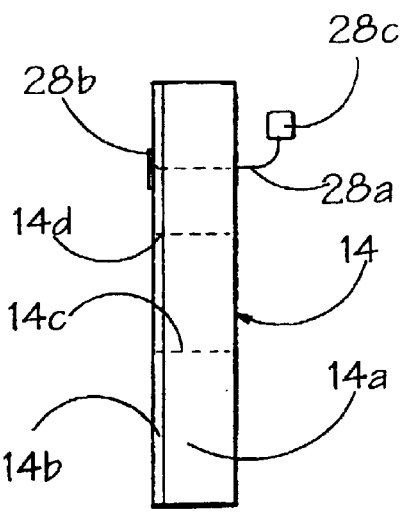
FIG.3a.   FIG.3b.
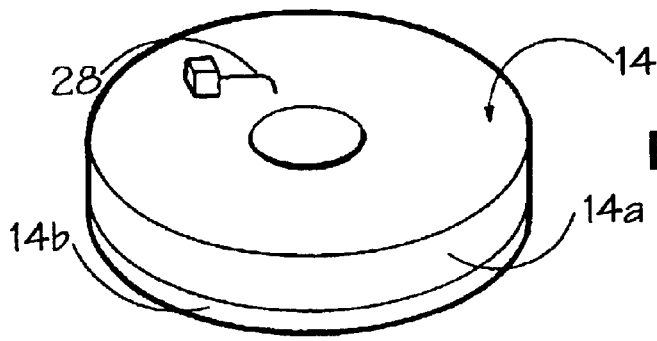
FIG.3c.
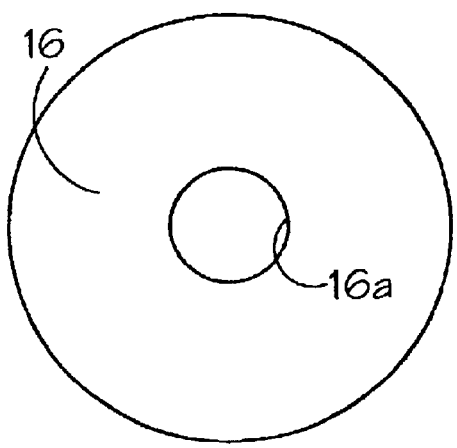
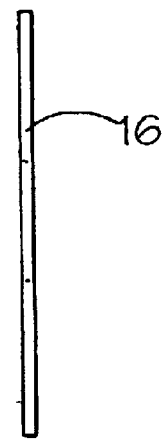
FIG.4a.   FIG.4b.

FILTER ASSEMBLY

The invention relates to a filter assembly. Particularly, but not exclusively, the invention relates to a filter assembly designed and adapted for use in a vacuum cleaner. More particularly, the invention relates to a filter assembly for use in a vacuum cleaner and which is used to protect the motor and fan unit.

Motor filter assemblies for removing dust remaining entrained in the air stream of a vacuum cleaner or other dust retaining appliances are common. Such filter assemblies generally comprise at least one filter located in a filter housing. Commonly, two or three filters are arranged in series in the filter assembly to maximise the amount of dust captured by the filter assembly. A known type of filter comprises a first foam filter which is located directly in the air stream and has a large dust retaining capacity. An electrostatic or HEPA grade filter, which is capable of trapping very small dust particles, in particular particles of less than one micron, is then provided downstream of the foam filter to retain any dust which escapes from the foam filter. In such a known arrangement, little or no dust is able to exit the filter assembly. It is known to provide a foam filter which is removable from the filter assembly for cleaning. WO 99/12635 discloses an air filter for respiratory apparatus comprising a series of filters; foam, electrostatic and HEPA. The filters are located in two separate housings, a first housing having a washable foam pre-filter and a second housing having both electrostatic and HEPA grade filters. The foam pre-filter retains the major portion of the entrained dust and is removable for cleaning. However, this arrangement is limited in that the electrostatic or HEPA grade filters, which retain dust which may escape the foam pre-filter, cannot be removed for cleaning. Therefore, the filters in the second housing will require to be replaced at frequent intervals.

It is an object of the present invention to provide a filter assembly suitable for use in a vacuum cleaner or other appliance which has a large capacity for retaining dust and wherein the filter components of the filter assembly do not require to be replaced at frequent intervals. It is a further object of the present invention to provide a filter assembly which retains the ability to contain dust under large back pressures. Further, it is an object of the present invention to provide a filter assembly for use in a vacuum cleaner or other appliance in which the motor is reliably protected and in which the maintenance costs of the vacuum cleaner or other appliance are reduced.

The invention provides a filter assembly for use in a vacuum cleaner having a first filter portion comprising a foam filter, and a second filter portion located downstream of the first filter portion and consisting of a HEPA grade filter medium, the first and second filter portions being held directly adjacent one another by means of a filter housing, the foam filter of the first filter portion being, in use, exposed directly to a dust-laden airflow, and the first filter portion being removable from the filter assembly, characterised in that the first filter portion further comprises an electrostatic filter located on the side of the foam filter facing the second filter portion. In such an arrangement, any dust which may escape from the foam filter is trapped by the electrostatic filter before it reaches the HEPA filter. Little or no dust will be deposited on the HEPA filter under normal use conditions. This prolongs the life of the HEPA filter since it is effective to separate dirt and dust only under extreme conditions, which are infrequent. Further, the foam filter and the electrostatic filter can be removed for cleaning in a single operation.

Preferably, the electrostatic filter is bonded to the foam filter. Bonding the electrostatic filter to the foam filter ensures that there can be no misplacement or misalignment of the electrostatic filter. If the electrostatic filter were inaccurately positioned, dust that might otherwise have been trapped in the electrostatic filter will pass to the HEPA filter. If this were to happen, the HEPA filter would need to be replaced more frequently. Bonding the electrostatic filter to the foam filter ensures that this does not happen. Further, bonding the electrostatic filter to the foam filter provides a filter core that can be easily removed from the filter assembly for cleaning. Alternatively, the electrostatic filter may be removably attached to the foam filter.

Preferably, the first filter portion is washable. The first filter portion will generally retain most of the dust or dirt entrained in the airflow. When the filter portion becomes less efficient than is desired due to excess loading, the user is able merely to wash the filter portion and, after drying, the first filter portion can be returned to the filter assembly for further use. The maintenance costs of the appliance are thus reduced.

Preferably, the second filter portion is washable. This means that the entire filter assembly can be cleaned by washing, which in turn means that replacement filters are not required. When the filter assembly becomes less efficient than is desirable due to excess loading, the user is able to wash both the first and second filter portions and, after drying, the filter assembly can be returned to the vacuum cleaner (or other appliance) for further use. Advantageously, maintenance costs of the appliance are thus reduced.

Preferably, the first and second filter portions are at least partially enclosed by means of the filter housing. Preferably, at least one of the filter portions is bonded to the filter housing. More preferably, the second filter portion is bonded to the filter housing. This ensures that the second filter portion cannot be misplaced or misaligned when the first filter portion is removed for washing.

Preferably, the first filter portion has a tab or gripping portion located on a surface thereof remote from the second filter portion to facilitate removal of the first filter portion from the filter housing. Advantageously, this provides a means for removing the first filter portion from the filter housing, when it needs to be cleaned, without the user having to directly handle it.

Further advantageous features are set out in the subsidiary claims.

Embodiments of the invention will now be described with reference to the accompanying drawings, in which:

FIG. 1b is a sectional view taken along line b—b of FIG. 1a;

FIG. 2 is an exploded view of the filter assembly of FIG. 1a;

FIGS. 3a, 3b and 3c are plan, side and perspective views respectively of a first filter portion forming part of the filter assembly shown in FIGS. 1 and 2;

FIGS. 4a and 4b are plan and side views respectively of a second filter portion forming part of the filter assembly shown in FIGS. 1 and 2;

Figure 1A:
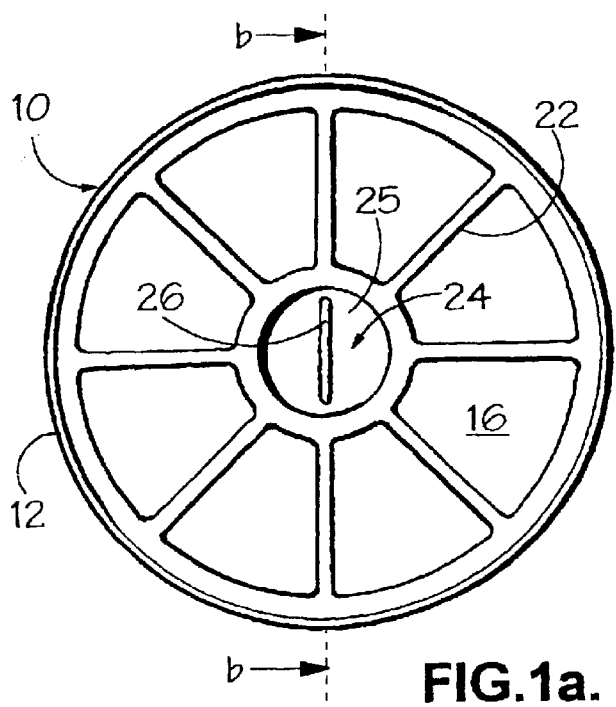
FIG. 1a is a plan view of a first filter assembly according to the invention.
Figure 1B:
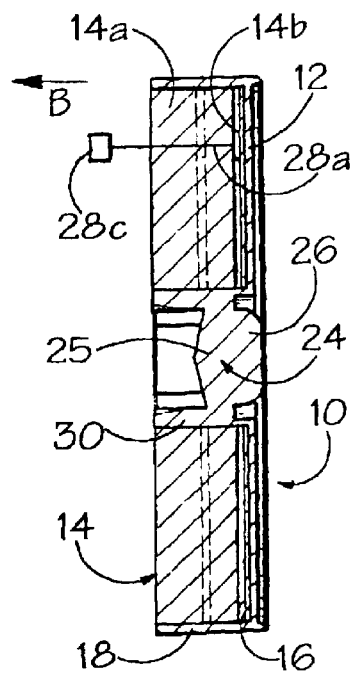
Figure 2:
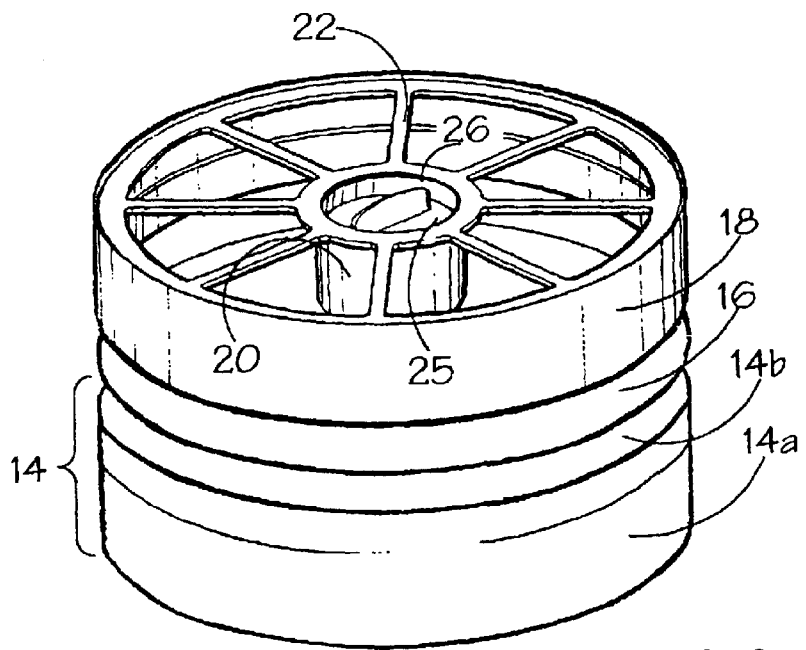

A first embodiment of a filter assembly according to the present invention is shown FIGS. 1a, 1b and 2. The filter assembly 10 essentially comprises a filter housing 12, a first filter portion 14 and a second filter portion 16. The filter housing 12 is cylindrical in shape and is manufactured from a suitable plastics material. The filter housing 12 has a cylindrical outer wall 18 which is adapted to receive the first and second filter portions 14, 16. A cylindrical sleeve 20 is located inwardly of the cylindrical outer wall 18 and is connected thereto by radially projecting arms or spokes 22 which extend between an end face of the cylindrical sleeve 20 and an end face of the cylindrical outer wall 18. As can be seen from FIG. 2, the spokes 22 lie generally in the plane of one end of the cylindrical outer wall 18. The cylindrical outer wall 18, the cylindrical sleeve 20 and the spokes 22 are manufactured integrally by means of known plastics forming techniques.

A central gripping portion 24 is provided on or within the cylindrical sleeve 20. It is also integrally moulded with the cylindrical outer wall 18, the cylindrical sleeve 20 and the spokes 22. The central gripping portion 24 essentially comprises a generally cylindrical portion 25 with a plate-like portion 26 extending therefrom along the axis of the filter housing 12. The plate-like portion 26 provides a user with the means to grasp the central gripping portion 24 in order to insert the filter assembly 10 into the appliance in which it is to be used, or to remove it therefrom. The plate-like portion 26 can incorporate a textured surface which will assist the user to grip the connector portion 24. The plate-like portion 26 is dimensioned so that it projects beyond the end surface of the filter housing 12 as shown in FIG. 1b. This feature can be used in conjunction with the vacuum cleaner in order to prevent the user from inadvertently positioning the filter assembly 10 in the relevant appliance in an incorrect orientation. More specifically, the vacuum cleaner will include a recess or other shaping into which the filter housing 12 is to be received, but the recess will not include any accommodation for the projecting plate-like portion 26. This ensures that the user will be unable to seat the filter housing 12 in the recess in the vacuum cleaner if the filter housing 12 is turned the wrong way up. The user will be alerted to this and will be able to correct the orientation of the filter housing 12.

It will be appreciated that the central sleeve 20 and/or the central gripping portion 24 can carry means for fixedly connecting the filter assembly 10 to the relevant appliance. The manner in which the filter assembly 10 is connected to the appliance is material to this invention and a skilled reader will appreciate that the connection can be formed by the mating of camming surfaces, by screw-threaded portions, by snap-fitting/quick-release fasteners or other equivalent means.

It is essential that the spokes 22 are arranged and configured so that a relatively small proportion of the area of the end face of the filter housing 12 in which the spokes 22 lie is obstructed by them. In the illustrated embodiment, eight spokes 22 are equi-angularly arranged about the cylindrical sleeve 20. However, the number of spokes 22 provided is not critical and it is envisaged that fewer or more than eight spokes 22 can be present. As few as four spokes and as many as sixteen spokes are expected to be acceptable, with eight or twelve spokes being preferred.

The first and second filter portions will now be described with reference also to FIGS. 3 and 4. The first filter portion 14 comprises a foam filter 14a and an electrostatic filter 14b. A suitable material from which the foam filter 14a can be manufactured is 90 ppi reticulated open cell polyurethane foam. The foam filter 14a is shaped and configured to form a cylindrical disc having a central aperture 14c. The foam filter 14a is dimensioned so as to substantially fill the interior of the filter housing 12. Therefore, the outer diameter of the foam filter 14a is substantially the same as the diameter of the cylindrical outer wall 18 of the filter housing 12, and the diameter of the central aperture 14c of the foam filter 14a is substantially the same as that of the cylindrical sleeve 20. In order to ensure that the interior of the filter housing 12 is reliably filled, it is preferred that the outer diameter of the foam filter 14a is slightly larger than the interior diameter of the cylindrical outer wall 18, and the diameter of the central aperture 14c of the foam filter 14a is slightly smaller than the outer diameter of the cylindrical sleeve 20. The electrostatic filter 14b is manufactured from a sheet of suitable electrostatic medium, for example, Technostat®. The electrostatic filter 14b is circular in shape and has a central aperture 14d. The electrostatic filter 14b is dimensioned so that the outer diameter thereof is substantially the same as the outer diameter of the foam filter 14a and the central aperture 14d of the electrostatic filter 14b is substantially the same as the central aperture 14c of the foam filter 14a. The electrostatic filter 14b is bonded to the foam filter 14a by suitable means so that the central aperture 14c and the central aperture 14d are aligned. Alternatively, the electrostatic filter 14b can be placed adjacent the foam filter 14a without being bonded thereto.

A tab 28 is provided on the first filter portion 14 in order to assist with the removal of the first filter portion 14 from the filter housing 12. The tab 28 can take any suitable form. In the embodiment shown, the tab 28 consists of a flexible elongate strand 28a having a securing tab 28b at one end and a gripping tab 28c at the other end. The securing tab 28b is pushed through the foam filter 14a and the electrostatic filter 14b of the first filter portion 14 in a manner commonly used in relation to textile materials and goods made therefrom. The strand 28a is made sufficiently long to ensure that the gripping tab 28c is accessible to the user in order to effect the removal of the first filter portion 14 from the filter housing 12. Alternatively, a simple textile or plastics tab could be secured to the outer surface of the first filter portion 14 by adhesives or by other means.

The second filter portion 16 is illustrated in FIGS. 4a and 4b. The second filter portion 16 consists of a HEPA grade filter medium covered on both sides by layers of a protective fabric. The layers are held together in known manner by stitching or other known means. The second filter portion 16 is circular in shape with a central aperture 16a for receiving the cylindrical sleeve 20 of the filter housing 12. The dimensions of the second filter portion 16 are chosen so that the second filter portion 16 covers the end face of the filter housing 16 in which the spokes 22 are formed. The second filter portion 16 is located directly adjacent the spokes 22 of the filter housing 12 and is bonded to the portion of the cylindrical outer wall 18 immediately adjacent the outer ends of the spokes 22. In this manner, the second filter portion 16 is held in a fixed position with respect to the filter housing 12. The second filter portion 16 is bonded to the filter housing 12 by any suitable method. Suitable methods include heat welding, ultra-sonic welding and adhesive. It is preferred that, during the bonding process, all of the layers of the second filter portion 16 are bonded to the filter housing 12 so that the risk of delamination of the second filter portion 16 during washing is reduced.

As can be seen from FIGS. 1 and 2, the assembly is arranged so that the second filter portion 16 is located directly adjacent the spokes 22 of the filter housing 12 and the first filter portion 14 is then located within the cylindrical outer wall 18 of the filter housing 12 directly adjacent the second filter portion 16. The electrostatic filter 14b of the first filter portion 14 lies directly adjacent the second filter portion 16.

In use, the filter assembly 10 is placed in the airflow path of the vacuum cleaner or other appliance in which the filter assembly 10 is to be used. The plate-like portion 26 is used to ensure that the filter housing 12 is correctly orientated. Specifically, the filter assembly 10 is arranged so that the open face of the filter housing 12, i.e. the end face remote from that in which the spokes 22 are arranged, faces upstream. Air to be filtered therefore enters the foam filter 14a first. Filtration takes place within the foam filter 14a which has a very significant capacity for trapping and retaining dust. However, continued use, particularly within a vacuum cleaner, may lead to an increase in the back pressure applied to the filter assembly 10. Any dust that may escape the foam filter 14a is trapped by the electrostatic filter 14b of the first filter portion 14. In the event that the first filter portion 14 is not removed and cleaned by washing before the back pressure applied across the filter assembly 10 reaches a critical value, dust previously retained within the first filter portion 14 will be expelled therefrom. However, the presence of the second filter portion 16 immediately downstream of the first filter portion 14 ensures that any dust released by the first filter portion 14 is retained within the filter assembly 10. When a filter assembly 10 of this sort is used as a pre-motor filter in a vacuum cleaner or other appliance, the motor is thereby reliably protected. Even when the filter assembly 10 is fully loaded with dust, there is still no emission of previously retained dust from the filter assembly 10 and the motor continues to be protected. Indeed, in this event, either the back pressure across the filter assembly 10 or the rise in operating temperature of the motor will normally be sufficient to operate a warning light to indicate to the user that the filter assembly requires to be removed and cleaned.

As has been mentioned above, the first filter portion 14 can be cleaned by washing. The second filter portion 16 is also capable of being cleaned by washing. If the second filter portion 16 is bonded to the filter housing 12, the second filter portion 16 and the filter housing 12 must be washed together. If the second filter portion 16 is not bonded to the filter housing 12, then the second filter portion 16 can of course be washed independently of the filter housing 12. However, care must then be taken to replace the second filter portion 16 in the filter housing 12 in a position which does not allow any air to pass through the filter assembly 10 without passing through the second filter portion 16.

It will be appreciated that the filter assembly described above can be manufactured with any appropriate dimensions. Purely for the purposes of illustration and without any intent to limit the disclosure herein, the dimensions of the filter housing 12 illustrated above are in the region of 140 mm diameter and 25 mm depth.

Figure 5:
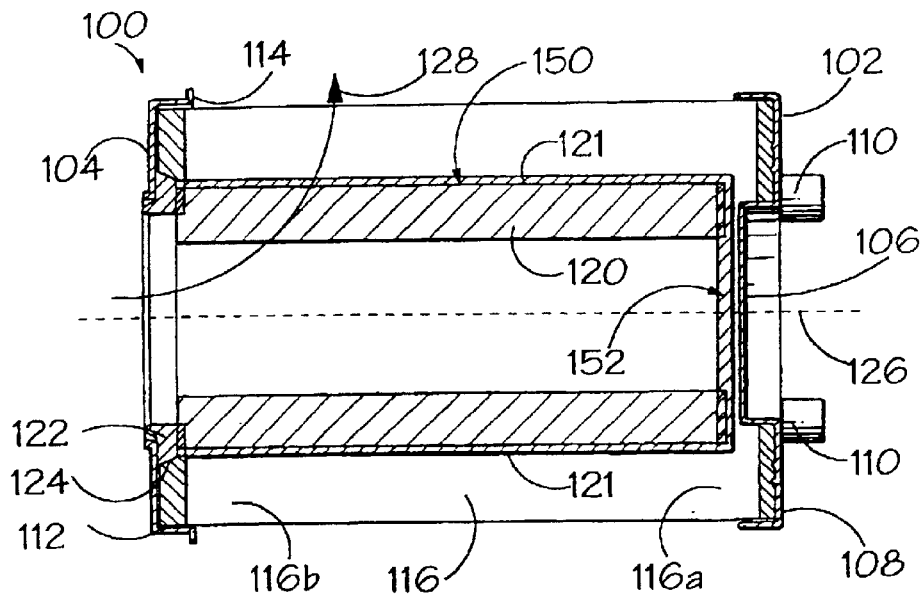
FIG. 5 is a sectional view of a second filter assembly according to the invention.
Figure 6A:
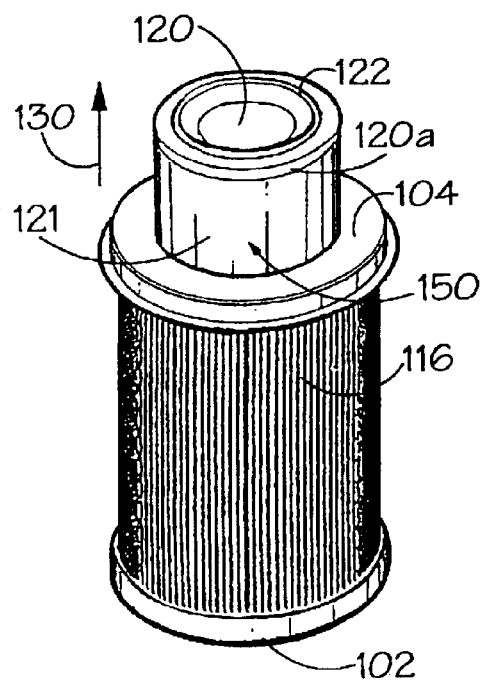
FIGS. 6a and 6b are perspective and sectional views respectively of the filter assembly of FIG. 5 shown on a reduced scale and showing the first filter portion in a partially removed position.
Figure 6B:
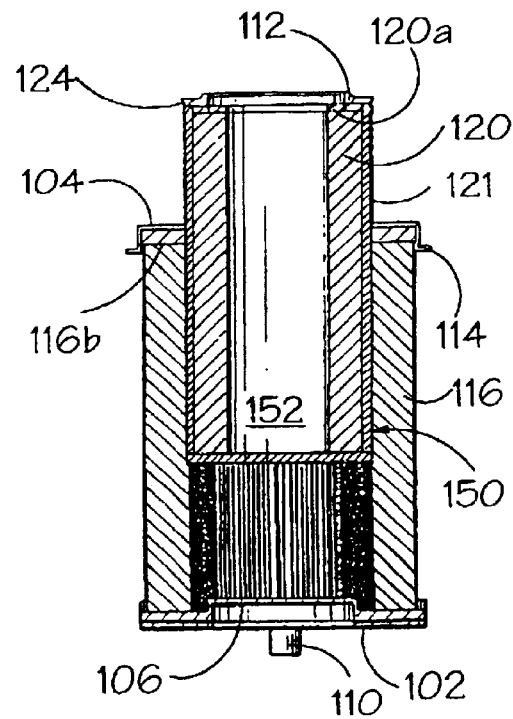

A second embodiment of a filter assembly according to the invention is illustrated in FIGS. 5, 6a and 6b. As can be seen from the Figures, the filter assembly 100 is again generally cylindrical in shape. In contrast to the embodiment illustrated in FIGS. 1 to 4, the axial length of the filter assembly 100 is greater than the diameter thereof.

The filter assembly 100 comprises a first housing portion 102 and a second housing portion 104. The first housing portion 102 is generally circular in shape and has a planar central portion 106 which is surrounded by a circular dished portion 108. Two outwardly projecting locating legs 110 are equispaced about the dished portion 108 and these extend away from the base of the dished portion 108 as shown in the Figures. The second housing portion 104 is annular in shape having an aperture in the centre thereof and a side wall 112 which mirrors the outermost extremity of the dished portion 108 of the first housing portion 102. An annular lip 114 extends radially outwardly from the distal edge of the side wall 112.

A HEPA grade filter 116 is located between the first and second housing portions 102, 104. The HEPA grade filter 116 comprises a pleat pack of 102 pleats of washable HEPA grade filter material which is arranged in a cylindrical form. A first end 116a is seated in the dished portion 108 of the first housing portion 102 and is bonded thereto by suitable means. Suitable means include potting, adhesives, etc. The bonding of the first end 116a of the HEPA grade filter 116 into the dished portion 108 is of sufficient quality to prevent any passage of air around the end of the HEPA grade filter 116 within the dished portion 108. The other end 116b of the HEPA grade filter 116 is seated in the second housing portion 104 radially inwardly of the side wall 112. The end 116b of the HEPA grade filter 116 is bonded to the second housing portion 104 by potting or adhesives or other suitable means. In this manner, the filter assembly 100 is given a cylindrical structure comprising the first and second housing portions 102, 104 and the HEPA grade filter 116.

A filter core 150 is provided radially inwardly of the HEPA grade filter 116. The filter core 150 comprises a cylindrical foam filter 120 and an electrostatic filter 121 located on the radially outer surface of the foam filter 120. The electrostatic filter 121 can be bonded to the cylindrical foam filter 120 by suitable means. Alternatively, the electrostatic filter 121 can be slipped over the cylindrical foam filter 120 without being bonded thereto. The filter core 150 is closed at a lower end by a circular disc portion 152. The disc portion 152 is securely bonded to the lower end by potting, adhesives, etc. The outer diameter of the filter core 150 is essentially the same as the internal diameter of the HEPA grade filter 116. This ensures that, when the filter core 150 is located inside the HEPA grade filter 116, the filter core 150, particularly the electrostatic filter 121, abuts against the internal surface of the HEPA grade filter 116. The internal diameter of the filter core 150 is sufficiently large to allow unrestricted entry of a dust-laden airflow into the interior of the filter assembly 100.

As shown in FIGS. 6a and 6b, a first end 120a of the filter core 150 has a gripping portion 122 attached thereto. The gripping portion 122 is preferably formed from potting so as to provided a resiliently deformable gripping portion which is securely bonded to the end 120a of the filter core 150. Alternatively, the gripping portion 122 could be moulded from a plastics material and bonded to the filter core 150 by a suitable adhesive. The gripping portion 122 is dimensioned and shaped so that its outermost extremity 124 abuts against the periphery of the aperture in the second housing portion 104 in a sealing manner when the filter core 150 is inserted into the filter assembly 100. The axial length of the filter core 150 is such that, when the outermost extremity 124 of the gripping portion 122 is in sealing contact with the second housing portion 104, the disc portion 152 of the filter core 150 presses against the central portion 106 of the first housing portion 102. The gripping portion 122 is annular in shape and has a central aperture communicating with the interior of the filter core 150.

Figure 7:
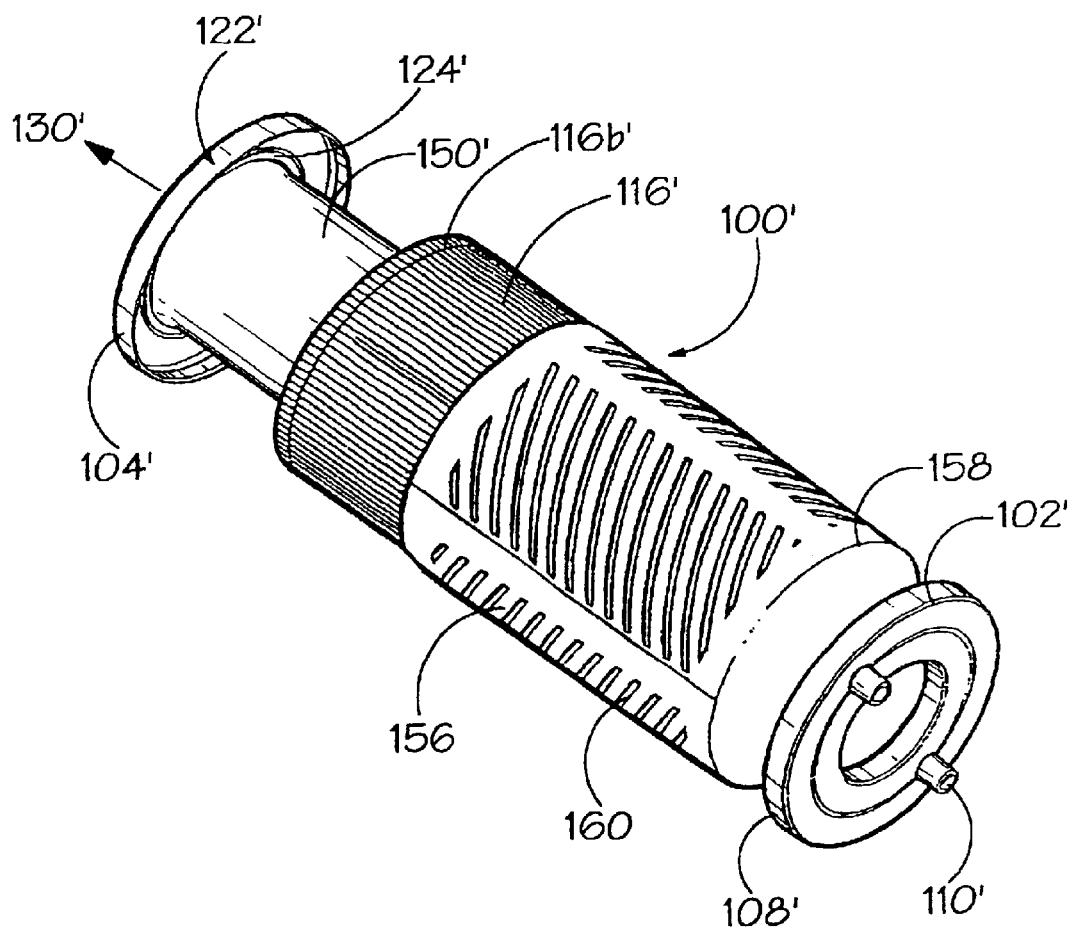
FIG. 7 is an exploded perspective view of a third filter assembly according to the invention and similar to that shown in FIGS. 5, 6a and 6b.

A third embodiment of the filter assembly is shown in FIG. 7. The filter assembly 100' has substantially the same construction as the filter assembly 100 shown in FIGS. 5, 6a and 6b, with the exception that the end 116b' of the HEPA grade filter 116' is sealed and the filter assembly 100' includes an outer casing 156. The end 116b' is sealed by suitable means, for example, potting, adhesives, etc. The end 116b' abuts against the interior surface of the second housing portion 104'. The outermost extremity 124' of the gripping portion 122' is securely bonded to the second housing portion 104'. The casing 156 is cylindrical in shape and is manufactured from a suitable plastics material. The casing 156 is adapted to receive the HEPA grade filter 116'. An end 158 of the casing 156 is seated in the dished portion 108' and is bonded thereto by suitable means, for example, adhesives or potting. Slots 160 are provided in the casing 156 to allow air to diffuse out of the filter assembly 100'. The casing 156 provides protection for the HEPA grade filter 116' during handling.

The airflow path through the filter assemblies 100, 100' is substantially the same for either embodiment. The description below refers to the second embodiment but it will be appreciated that the description equally applies to the third embodiment. In use, the filter assembly 100 is placed upstream of the motor and fan assembly of a vacuum cleaner. The airflow path of the vacuum cleaner is designed and arranged so that air exiting the main dirt and dust collecting apparatus, preferably a cyclonic separating apparatus, enters the filter assembly 100 by way of the aperture in the gripping portion 122. The air then passes into the cylindrical passage surrounded and delimited by the filter core 150. The end of this passage remote from the gripping portion 122 is closed by the disc portion 152 and the central portion 106 of the first housing portion 102. Because the filter core 150 presses against the central portion 106, the only available exit from the passage is through the cylindrical foam filter 120. The air therefore moves radially outwardly away from the longitudinal axis 126 of the filter assembly 100. Having passed through the cylindrical foam filter 120, the airflow continues radially outwardly in the direction of the arrow 128 and passes through the electrostatic grade filter 121. The airflow then passes through the HEPA grade filter medium of the second filter portion 116 before exiting the filter assembly 100 in a radial direction.

Under normal operational circumstances, the vast majority of any fine dust entrained within the airflow entering the filter assembly 100,100' will be trapped within the pores of the cylindrical foam filter 120 and the electrostatic filter 121. Little or no dust will be collected in the HEPA grade filter 116. This is because the cylindrical foam filter 120 has a large capacity for retaining dust particles and any dust that may escape from the cylindrical foam filter 120 will be trapped by the electrostatic filter 121 of the filter core 150. When the filter core 150 is approaching its loading capacity, it should ideally be removed and cleaned. This can be achieved merely by the user gripping the gripping portion 122,122' and lifting the filter core 150 out of the filter assembly 100 in the direction of arrow 130 as shown in FIGS. 6a and 7. The filter core 150 is then washed by rinsing under a household tap in a known manner and allowed to dry. The filter core 150 is then re-inserted into the interior of the filter assembly 100,100' and operation can continue.

It is preferred that the HEPA grade filter material from which the HEPA grade filter 116 is made should be washable. This ensures that the HEPA grade filter 116 does not degrade or deteriorate to any significant extent in the event that the filter core 150 is returned to use before it is completely dry. Also, it is possible that the filter core 150 will not be cleaned by washing before its loading capacity is exceeded. In this event, dust previously trapped by the filter core 150 maybe expelled therefrom. Any and all dust expelled from the filter core 150 will inevitably be trapped and captured by the HEPA grade filter 116. If a significant amount of dust is allowed to accumulate on the HEPA grade filter 116, it can then be washed by rinsing under a household tap and allowed to dry. Operation of the vacuum cleaner can then be resumed.

The locating legs 110 are illustrated in FIGS. 5, 6b and 7 as being equispaced about the longitudinal axis 126 of the filter assembly 100,100'. If the vacuum cleaner or other apparatus in which the filter assembly 100,100' requires a specific rotational orientation of the filter assembly 100,100', then an asymmetrical arrangement of locating legs can be provided so that the filter assembly 100,100' cannot be properly located in the appliance in any orientation other than the correct one. However, with airflow entry being arranged axially and airflow exit being allowed in all rotational directions as illustrated in FIGS. 5, 6a, 6b and 7, this is not necessary.

Modifications and variations will be apparent to a skilled reader. Means and devices for holding the filter assembly in the relevant appliance and for correctly orientating it in position, other than those mentioned above, are not intended to be excluded from protection. It will also be appreciated that the shape of the filter or filter housing need not be cylindrical and other shapes will be equally suitable. Indeed, the filter housing shown in FIGS. 1 to 4 need not be open on one side when the filter assembly is in use: the filter housing could take the form of a cage-like structure having closed side walls but with both end surfaces defined by spokes or a mesh. One or both end surfaces could be removable or openable to allow access to the filter portions for cleaning purposes. Either or both of the cylindrical sleeve and the central gripping portion may be omitted from the filter housing. If the central sleeve is omitted, the central apertures of the first and second filter portions will also be omitted. Other variations will be apparent to a skilled reader.

What is claimed is:

1. A filter assembly configured and sized for use in a vacuum cleaner, comprising a filter housing, a first filter portion comprising a foam filter and an electrostatic filter bonded to the foam filter, and a second filter portion located downstream of the first filter portion and comprising a HEPA grade filter medium, the first and second filter portions being held directly adjacent one another within the filter housing, the foam filter of the first filter portion being configured so that, in use, the foam filter is exposed directly to a dust-laden airflow, and the first filter portion being configured so as to be removable from the filter assembly, wherein the electrostatic filter is located on the side of the foam filter facing the second filter portion.

2. A filter assembly as claimed in claim 1, wherein the first filter portion is washable.

3. A filter assembly as claimed in claim 1, wherein the second filter portion is washable.

4. A filter assembly as claimed in claim 1, wherein the filter housing is formed from a plastic material.

5. A filter assembly as claimed in claim 1, wherein at least one of the filter portions is bonded to the filter housing.

6. A filter assembly as claimed in claim 5, wherein the second filter portion is bonded to the filter housing.

7. A filter assembly as claimed in claim 1, wherein the filter housing has an open side adapted to allow introduction of the first filter portion into the interior of the filter housing.

8. A filter assembly as claimed in claim 1, wherein the first filter portion has a tab or gripping portion located on a surface thereof remote from the second filter portion to facilitate removal of the first filter portion from the filter housing.

9. A filter assembly as claimed in claim 1, wherein the first filter portion is cylindrical in shape and is closed at one end.

10. A filter assembly as claimed in claim 1, wherein the filter housing further comprises locating means for preventing incorrect orientation of the filter housing within the vacuum cleaner.

11. A filter assembly as claimed in claim 10, wherein the locating means comprises a projection located on the filter housing and extending outwardly therefrom.

12. A filter assembly as claimed in claim 1, wherein the filter assembly is generally cylindrical in shape.

13. A filter assembly as claimed in claim 12, wherein the filter assembly is configured so that, in use, the direction of flow of the airflow sequentially through the first and second filter portions is generally parallel to a longitudinal axis of the cylindrical filter assembly.

14. A filter assembly as claimed in claim 13, wherein, in use, the direction of the flow of the airflow sequentially through the first and second filter portions is generally radial relative to the longitudinal axis of the filter assembly.

15. A vacuum cleaner having an airflow path and comprising at least one filter assembly as claimed in claim 1 located in the airflow path.

16. A vacuum cleaner as claimed in claim 15, further comprising a motor for causing air to flow along the airflow path, wherein the filter assembly is positioned upstream of the motor.

* * * * *